(12) United States Patent
Nonin

(10) Patent No.: US 11,290,844 B2
(45) Date of Patent: Mar. 29, 2022

(54) DISTANCE MEASUREMENT APPARATUS AND DISTANCE MEASUREMENT METHOD

(71) Applicants: Kabushiki Kaisha Toshiba, Tokyo (JP); Toshiba Electronic Devices & Storage Corporation, Tokyo (JP)

(72) Inventor: Katsuya Nonin, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/003,299

(22) Filed: Aug. 26, 2020

(65) Prior Publication Data

US 2021/0258724 A1 Aug. 19, 2021

(30) Foreign Application Priority Data

Feb. 14, 2020 (JP) .............................. JP2020-023336

(51) Int. Cl.
*H04W 4/02* (2018.01)
*G01S 11/02* (2010.01)
*H04B 17/318* (2015.01)

(52) U.S. Cl.
CPC ............. *H04W 4/023* (2013.01); *G01S 11/02* (2013.01); *H04B 17/318* (2015.01)

(58) Field of Classification Search
CPC .................................. G01S 11/06; G01S 5/02
USPC .......................................... 307/104; 340/539
See application file for complete search history.

(56) References Cited

U.S. PATENT DOCUMENTS

| 2014/0340193 | A1* | 11/2014 | Zivkovic ............ G07C 9/00309 340/5.61 |
| 2017/0190317 | A1* | 7/2017 | Hamada .................... G01S 3/28 |
| 2018/0267154 | A1 | 9/2018 | Ootaka et al. |
| 2020/0081088 | A1* | 3/2020 | Nishikawa ............ G01S 13/825 |

FOREIGN PATENT DOCUMENTS

| JP | 6396855 B2 | 9/2018 |
| JP | 2018-155724 A | 10/2018 |
| JP | 2019-056636 A | 4/2019 |
| JP | 2019-100055 A | 6/2019 |

* cited by examiner

*Primary Examiner* — Kiet M Doan
(74) *Attorney, Agent, or Firm* — Allen & Overy LLP

(57) ABSTRACT

A distance measurement apparatus, which calculates distances between a first device and a second device based on carrier phase detection, includes a distance measurement operation unit that calculates the distances based on respective phases of a plurality of carrier signals included in each of a first distance measurement signal and a second distance measurement signal respectively transmitted from the first device and the second device, a received signal strength indicator measurement unit that measures respective received signal strength indicators of at least some of the plurality of carrier signals, and a carrier signal relay presence or absence judgment unit that judges presence or absence of relay of the carrier signals based on distance information about the plurality of distances calculated in the distance measurement operation unit and received signal strength indicator information about the plurality of received signal strength indicators measured in the received signal strength indicator measurement unit.

6 Claims, 12 Drawing Sheets

VARIANCE FOR DIFFERENCE ΔR BETWEEN PREVIOUS
AND CURRENT MEASURED DISTANCE VALUES R

VARIANCE FOR DIFFERENCE ΔR BETWEEN PREVIOUS
AND CURRENT MEASURED DISTANCE VALUES R

DISTANCE MEASUREMENT APPARATUS AND DISTANCE MEASUREMENT METHOD

CROSS-REFERENCE TO RELATED APPLICATION

This application is based upon and claims the benefit of priority from the prior Japanese Patent Application No. 2020-23336 filed in Japan on Feb. 14, 2020; the entire contents of which are incorporated herein by reference.

FIELD

An embodiment described herein relates to a distance measurement apparatus and a distance measurement method.

BACKGROUND

In recent years, a keyless entry system for facilitating locking and unlocking of a vehicle has been adopted in many automobiles. Such a technique enables a user of an automobile to lock and unlock a door using communication between a key of the automobile and the automobile. Further, in recent years, a smart key system capable of locking and unlocking a door and starting up an engine without a user touching a key has widely spread.

On the other hand, cases where an attacker makes unauthorized entry into a communication between a key and an automobile and steals the automobile or goods in the automobile frequently occur. There has been a discussion on how to implement preventive measures against such an attack, i.e., a so-called relay attack, at a low cost. According to the preventive measures, a distance between the key and the automobile is measured and unlocking of the door can be prohibited when it is judged that the distance is A predetermined distance or more. For example, a plurality of carrier signals for measuring the distance between the key and the automobile are transmitted and received between the key and the automobile to judge presence or absence of the so-called relay attack.

However, a case of a relay attack in which carrier signals between the key and the automobile are also relayed has not been taken into consideration.

DETAILED DESCRIPTION

A distance measurement apparatus according to an embodiment is a distance measurement apparatus that calculates a plurality of distances between a first device and a second device based on carrier phase detection, and includes a distance measurement operation unit configured to calculate the plurality of distances based on respective phases of a plurality of carrier signals included in each of a first distance measurement signal and a second distance measurement signal respectively transmitted from the first device and the second device, a received signal strength indicator measurement unit configured to measure respective received signal strength indicators of at least some of the plurality of carrier signals, and a carrier signal relay presence or absence judgment unit configured to judge presence or absence of relay of the carrier signals based on distance information about the plurality of distances calculated in the distance measurement operation unit and received signal strength indicator information about the plurality of received signal strength indicators measured in the received signal strength indicator measurement unit.

An embodiment will be described below with reference to the drawings.

(Configuration)

Figure 1:
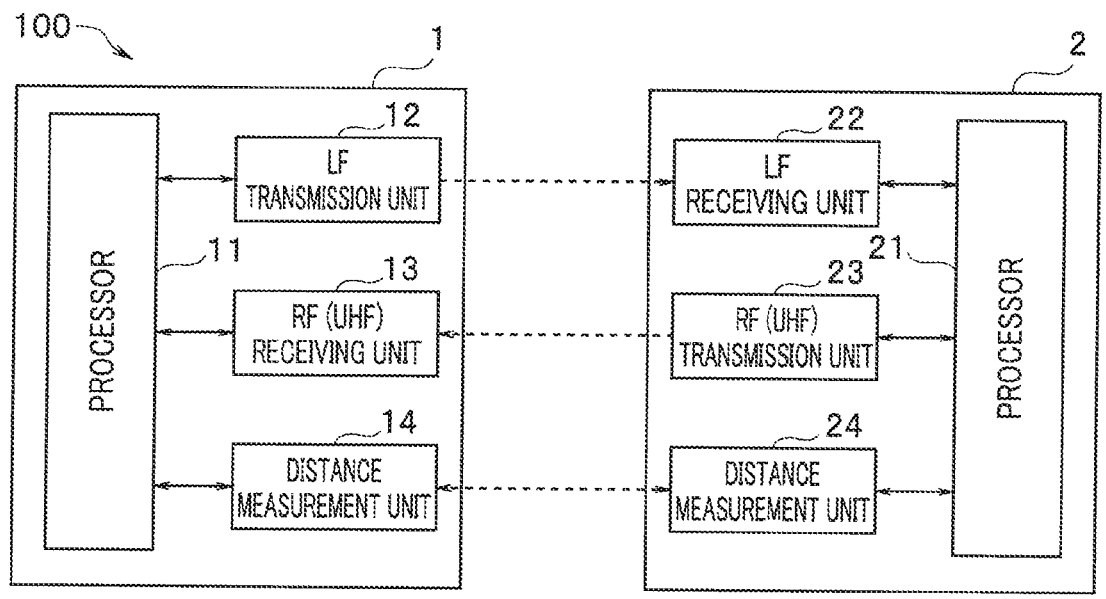
FIG. 1 is a configuration diagram of a wireless communication system including a distance measurement apparatus according to an embodiment.
Figure 2:
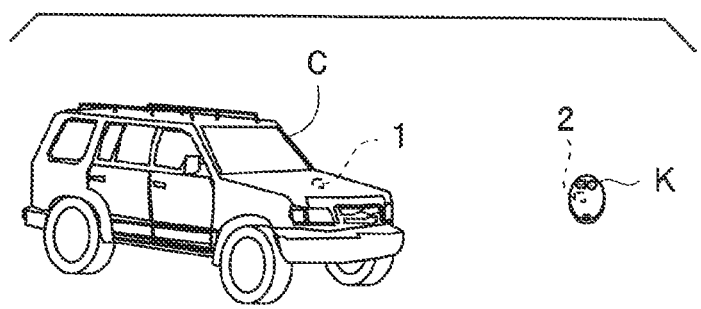
FIG. 2 is a configuration diagram for describing a smart key system to which the wireless communication system according to the embodiment is applied.

FIG. 1 is a configuration diagram of a wireless communication system including a distance measurement apparatus according to the present embodiment. FIG. 2 is a configuration diagram for describing a smart key system to which the wireless communication system according to the present embodiment is applied. At least one of a device 1 and a device 2 is movable.

As illustrated in FIG. 1, the device 1 includes a processor 11, an LF transmission unit 12, an RF (radio frequency) receiving unit 13, and a distance measurement unit 14. The device 2 includes a processor 21, an LF receiving unit 22, an RF transmission unit 23, and a distance measurement unit 24.

A smart key system 100 includes an automobile C and a key K configured to lock and unlock a door of the automobile C and start up an engine of the automobile C. More specifically, the smart key system 100 performs wireless communication according to a predetermined protocol between the device 1 loaded into the automobile C and the device 2 contained in the key K, to enable the door to be locked, for example, when the key K is correctly authenticated in the automobile. In the smart key system 100, a distance between the device 1 and the device 2 is calculated based on carrier phase detection, and it is judged whether or not the distance is within a predetermined distance, as described below.

When a user enters an LF (low frequency) area as an area where an L signal from the device 1 loaded into the automobile C can be received, authentication is performed. The LF signal is a beacon signal as a radio signal in a 130 KHz band, for example. When receiving the beacon signal, the device 2 contained in the key K transmits identification code information, and the device 1 performs authentication based on the received identification code information. A radio signal in a UHF band, e.g., a 300 MHz band is used for the transmission of the identification code information for the authentication. When the authentication is succeeded, the distance between the device 1 and the device 2 is measured.

Figure 3:
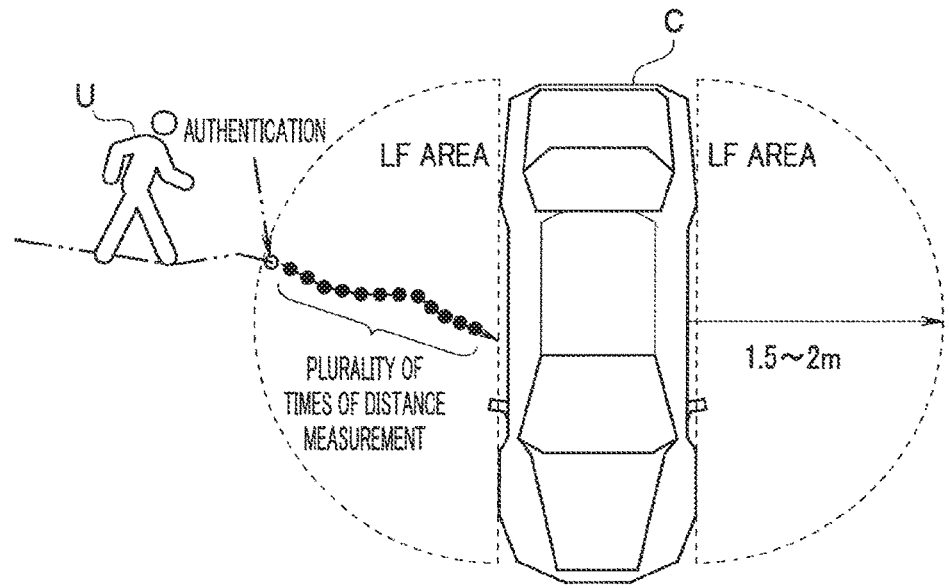
FIG. 3 is a diagram for describing how authentication and distance measurement are performed when a user who holds a key has approached a vicinity of an automobile according to the embodiment.

FIG. 3 is a diagram for describing how authentication and distance measurement are performed when a user U who holds the key K has been approaching a vicinity of the automobile C. In FIG. 3, a range indicated by a dotted line represents an LF area. The LF area is a range that the beacon signal reaches and an area within 1.5 to 2 meters from a center of a side surface of the automobile C, for example. When the device 2 held by the user U enters the LF area, after authentication, two or more carrier signals for distance measurement are transmitted and received a plurality of times between the device 1 and the device 2 and distance measurement is performed a plurality of times, here a predetermined number of times. Each of the carrier signals is an unmodulated continuous wave (CW). The carrier signal is a wireless signal in a sub-gigahertz band, e.g., a 920 MHz band.

Figure 4:
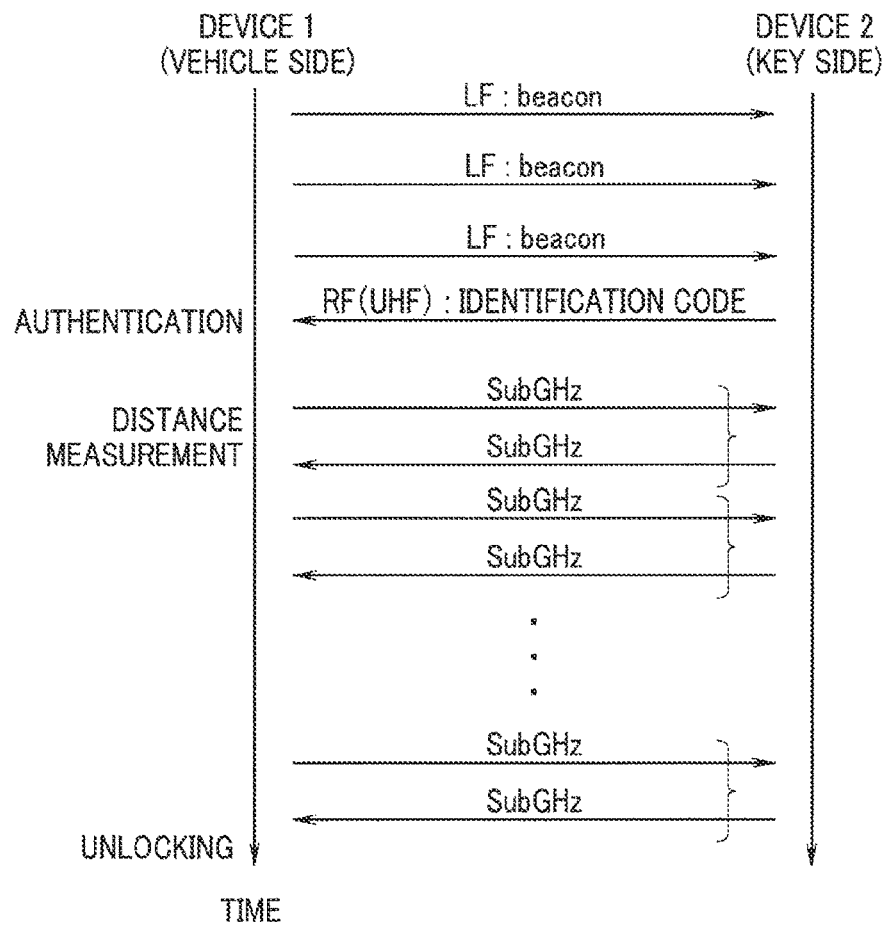
FIG. 4 is a diagram illustrating a transmission/reception sequence of a wireless signal performed between a device in the automobile and a device in the key according to the embodiment.

FIG. 4 is a diagram illustrating a transmission/reception sequence of a wireless signal performed between the device 1 in the automobile C and the device 2 in the key K.

The device 1 always transmits a beacon signal from the LF transmission unit 12. Since the beacon signal is a signal that reaches only the LF area, the LF receiving unit 22 in the device 2 can receive the beacon signal only when the device 2 is within the LF area.

The device 2, in response to the reception of the beacon signal, enters a predetermined standby state at the same time that the device 2 transmits identification code information from the RF transmission unit 23. When the RF receiving unit 13 in the device 11 receives the identification code information, the processor 11 performs authentication based on the received identification code information. When the processor 11 can correctly perform authentication based on the received identification code information, the processor 11 controls the distance measurement unit 14 to transmit a plurality of carrier signals each having a predetermined frequency as a first distance measurement signal. Then, in response to the reception of the first distance measurement signal from the device 1, a plurality of carrier signals each having a predetermined frequency are also transmitted as a second distance measurement signal from the device 2. The distance between the device 1 and the device 2 is measured based on the plurality of phases of the plurality of carrier signals from the device 1 and the plurality of phases of the plurality of carrier signals from the device 2.

In other words, the distance measurement unit 14 in the device 1 transmits a plurality of first carrier signals as the first distance measurement signal, and the distance measurement unit 24 in the device 2 transmits a plurality of second carrier signals as the second distance measurement signal. The distance measurement unit 14 detects a phase of each of the plurality of second carrier signals, and the distance measurement unit 24 detects a phase of each of the plurality of first carrier signals, and transmits phase information about the detected phase of each of the first carrier signals to the distance measurement unit 14. A distance measurement operation unit 54, described below, is provided in the distance measurement unit 14, to calculate a distance based on the detected phase of each of the second carrier signals and the received phase information.

The distance between the device 1 and the device 2 is measured using a method as disclosed in Japanese Patent Application Laid-Open Publication No. 2018-155724, for example. The distance between the device 1 and the device 2 is calculated based on the respective phases of the carrier signals calculated in each of the device 1 and the device 2. According to the method disclosed in Japanese Patent Application Laid-Open Publication No. 2018-155724, a device 1 transmits two or more (here, two) carrier signals as a first distance measurement signal, and a device 2 transmits two or more (here, two) carrier signals as a second distance measurement signal. The device 2 detects a phase difference between the received two carrier signals as the first distance measurement signal, and transmits information about the phase difference to the device 1. The device 1 detects respective phases of the received two carrier signals as the second distance measurement signal, and calculates a phase difference between the two carrier signals. The device 1 calculates the distance between the device 1 and the device 2 based on the phase difference detected by the device 1 and the phase difference information received from the device 2 using a predetermined operation.

Note that in the present embodiment, three carrier signals respectively having different frequencies f1, f2, and f3 are used, as described below. The three carrier signals are transmitted and received between the device 1 and the device 2, and a distance measurement operation is performed using two of the three carrier signals.

Note that in the present embodiment, the device 2 may transmit information about each of the phases of the received two carrier signals to the device 1, and the device 1 calculates a phase difference based on information about the two phases received from the device 2.

The device 1 can judge presence or absence of a relay attack based on a calculated distance (hereinafter referred to as a measured distance value) Rm between the device 1 and the device 2.

Further, in the present embodiment, distance measurement is performed a plurality of times, here a predetermined number of times also in consideration of a case where the plurality of carrier signals from the device 2 in the key K have been relayed, and it is judged whether or not the carrier signals have been relayed. More specifically, to perform distance measurement a plurality of times, the device 1 transmits and receives the distance measurement signal to and from the device 2 after authentication, and the device 2 transmits the second distance measurement signal in response to reception of the first distance measurement signal from the device 1. The device 1 measures a received signal strength indicator (hereinafter abbreviated as an RSSI) of each of the carrier signals as the second distance measurement signal from the device 2 at the time of the each distance measurement, and judges whether or not the carrier signals have been relayed based on a variance for respective values of the RSSIs (hereinafter abbreviated as RSSIs) and a variance for calculated measured distance values Rm.

In other words, in the present embodiment, distance measurement is performed a plurality of times, and it is judged whether or not the carrier signals have been relayed based on a correlation between a variance for measured distance values Rm as a plurality of distance measurement results and a variance for a plurality of RSSIs. A carrier signal relay presence or absence judgment unit 57, described below, outputs to the processor 11 a carrier signal relay presence or absence signal based on presence or absence of the correlation.

The correlation between the variance for the measured distance values Rm as the plurality of distance measurement results and the variance for the plurality of RSSIs will be described below.

The processor 11 in the device 1 includes a central processing unit (hereinafter referred to as a CPU), a ROM, a RAM, and the like, and the ROM stores programs that control respective operations of the LF transmission unit 12, the RF receiving unit 13, and the distance measurement unit 14. The processor 11 further calculates a phase difference between the respective phases of the two carrier signals received in the distance measurement unit 14. Further, the distance measurement unit 14 calculates the measured distance values Rm using the phase difference and a phase difference included in the phase information received from the device 2.

As described above, distance measurement for measuring the distance between the device 1 and the device 2 is performed a predetermined number of times. The processor 11 in the device 1 judges whether or not a door unlocking permission signal is outputted based on a result of the predetermined number of times of distance measurement and the result of the above-described judgment of the presence or absence of the relay attack by the relay of the carrier signals.

The processor 21 in the device 2 includes a CPU, a ROM, a RAM, and the like, and the ROM stores programs that control respective operations of the LF receiving unit 22, the RF transmission unit 23, and the distance measurement unit 24. The processor 21 further measures respective phases of the carrier signals received in the distance measurement unit 24, and transmits respective phase information of the measured phases to the device 1.

The transmission of the phase information from the device 2 to the device 1 is performed using the distance measurement unit 24 of the device 2 by a method of modulating data of the phase information using a predetermined modulation system and transmitting the modulated data to the device 1, for example.

Note that although each of the processors 11 and 21 includes the CPU, the ROM, and the like for executing software programs that respectively implement the respective functions, the processor nay include an electronic circuit such as a semiconductor device or an FPGA (field programmable gate array) and implement the functions using the circuit or the like.

Figure 5:
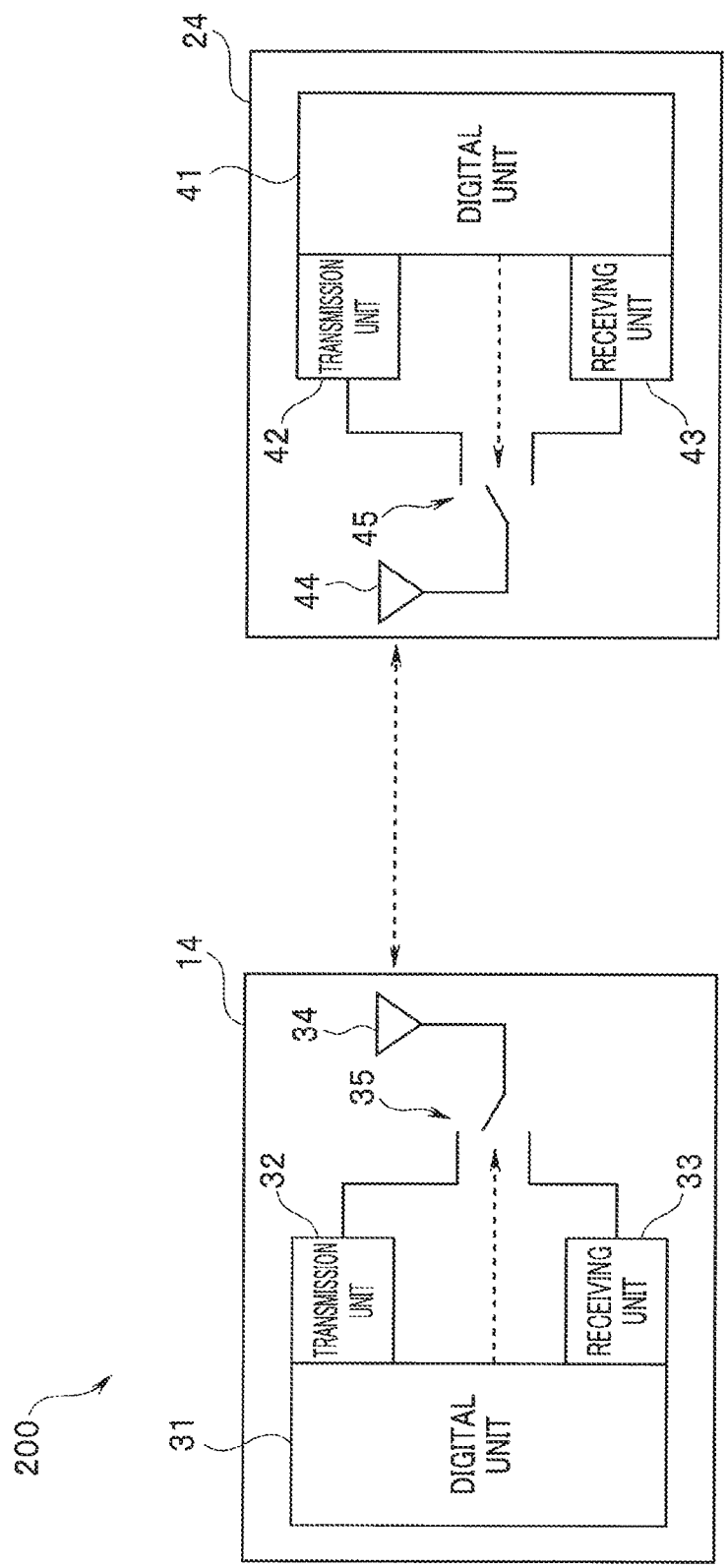
FIG. 5 is a configuration diagram of a distance measurement apparatus according to the embodiment.

FIG. 5 is a configuration diagram of the distance measurement apparatus according to the embodiment. A distance measurement apparatus 200 includes the distance measurement units 14 and 24, and calculates the distance between the device 1 and the device 2 based on carrier phase detection. The distance measurement unit 14 is included in the device 1, and includes a digital unit 31, a transmission unit 32, a receiving unit 33, an antenna 34, and an antenna switch 35. The digital unit 31, the transmission unit 32, the receiving unit 33, and the antenna switch 35 are configured as one or two or more semiconductor devices. The distance measurement unit 24 is included in the device 2, and includes a digital unit 41, a transmission unit 42, a receiving unit 43, an antenna 44, and an antenna switch 45. The digital unit 41, the transmission unit 42, the receiving unit 43, and the antenna switch 45 are configured as one or two or more semiconductor devices.

The digital unit 31 in the device 1 controls the transmission unit 32, the receiving unit 33, and the antenna switch 35 in response to a control signal from the processor 11. The digital unit 41 in the device 2 controls the transmission unit 42, the receiving unit 43, and the antenna switch 45 in response to a control signal from the processor 21.

Figure 6:
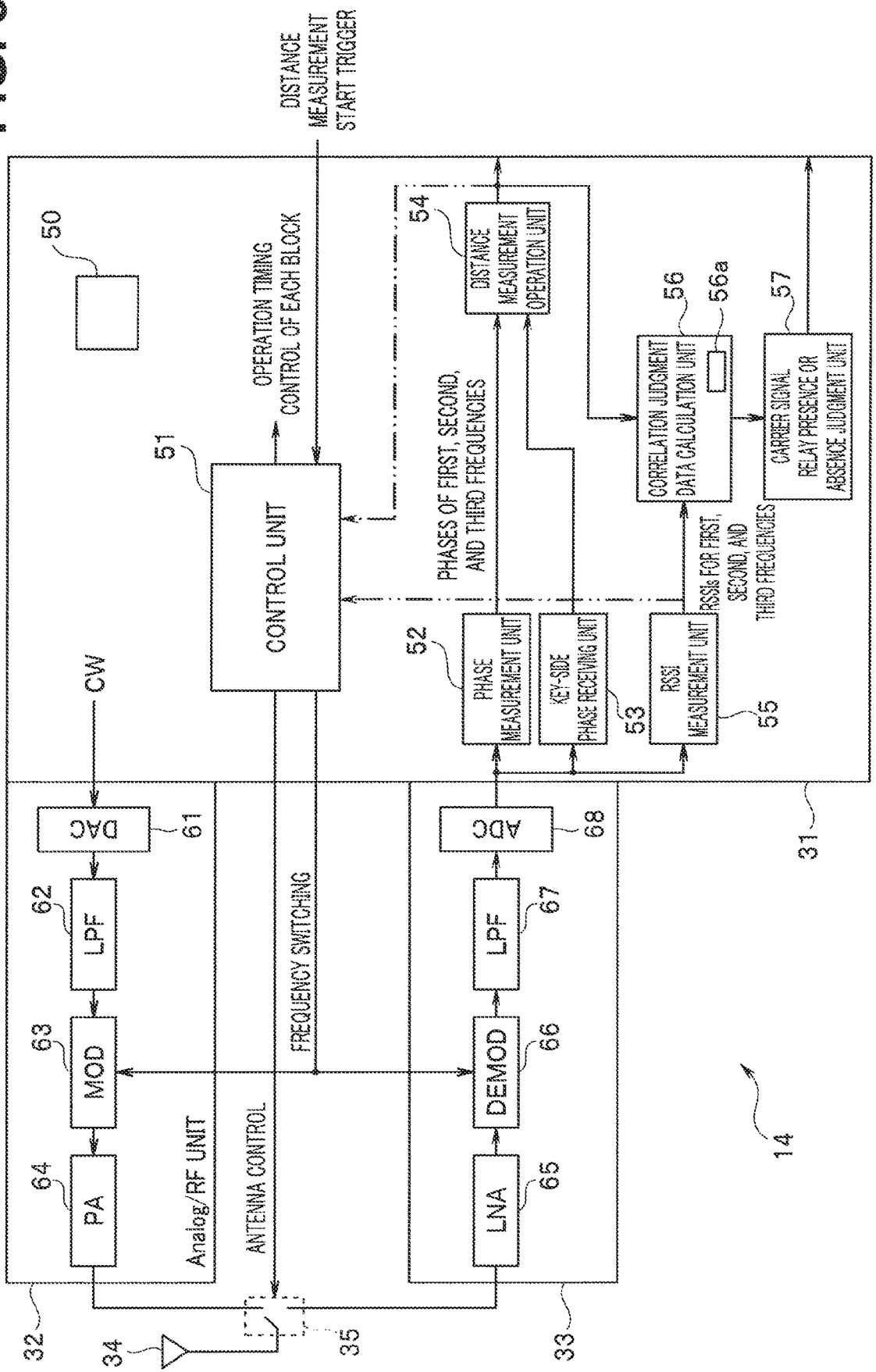
FIG. 6 is a circuit diagram of a distance measurement unit in the device loaded into the automobile according to the embodiment.

FIG. 6 is a circuit diagram of the distance measurement unit 14 in the device 1. The digital unit 31 is composed of digital circuits on the semiconductor device, for example. The digital unit 31 includes a reference oscillator 50, a control unit 51, a phase measurement unit 52, a key-side phase receiving unit 53, the distance measurement operation unit 54, an RSSI measurement unit 55, a correlation judgment data calculation unit 56, and the carrier signal relay presence or absence judgment unit 57.

The reference oscillator 50 is a reference signal source configured to generate a basic clock signal of an operation within the distance measurement unit 14. Upon receiving a command signal (hereinafter referred to as a distance measurement start trigger signal) as a distance measurement start trigger from the processor 11, the control unit 51 controls an operation timing of each of blocks such as the phase measurement unit 52 to perform an operation of a predetermined distance measurement sequence.

The phase measurement unit 52 measures the phase of each of the carrier signals from the device 2. The phase measurement unit 52 is a circuit configured to measure respective phases of three carrier signals from the device 2 that have been received in the receiving unit 33. In other words, the phase measurement unit 52 measures the phase of each of the received three carrier signals. Information about the phase of each of the three carrier signals obtained by the phase measurement unit 52 is fed to the distance measurement operation unit 54.

The key-side phase receiving unit 53 is a circuit configured to receive the phase information of the three carrier signals which have been measured in the device 2. The three carrier signals are received from the device 2.

The distance measurement operation unit 54 calculates the distance between the device 1 and the device 2 using respective phases of two of the carrier signals respectively having the frequencies f1, f2, and f3 received by the device 1 and phase information (the respective phases of two of the carrier signals respectively having the frequencies f1, f2, and f3) received from the device 2. In other words, the distance measurement operation unit 54 calculates the distance between the device 1 and the device 2 based on the respective phases of the plurality of carrier signals included in each of the first distance measurement signal and the second distance measurement signal respectively transmitted from the device 1 and the device 2.

The distance measurement operation unit 54 performs distance measurement using a phase difference between the two carrier signals respectively having the two different frequencies. In other words, the distance measurement operation unit 54 calculates a distance using a phase difference between the two carrier signals received by the distance measurement unit 14 and a phase difference between the two carrier signals received by the distance measurement unit 24.

Note that three distances may be calculated based on the respective phases of the three carrier signals received from the device 2 and the respective phase information of the three carrier signals from the device 2, to set an average value of the three distances as the distance between the device 1 and the device 2.

The RSSI measurement unit 55 measures, from received powers of the received three carrier signals, three received signal strength indicators (RSSIs) of the three carrier signals, respectively. In other words, the RSSI measurement unit 55 measures respective received signal strength indicators (RSSIs) of at least some of the plurality of carrier signals.

The correlation judgment data calculation unit 56 is a circuit configured to calculate various types of data for judging presence or absence of a correlation between a variance for measured distance values Rm and a variance for a plurality of RSSIs. The correlation judgment data calculation unit 56 includes a storage unit 56a as a register storing data. Processing by the correlation judgment data calculation unit 56 will be described below.

The carrier signal relay presence or absence judgment unit 57 is a circuit configured to judge presence or absence of a relay attack in which the carrier signals have been relayed using various types of data obtained by the correlation judgment data calculation unit 56. In the present embodiment, the carrier signal relay presence or absence judgment unit 57 judges presence or absence of the relay of the carrier signals based on distance information about a plurality of distances calculated in the distance measurement operation unit 54 and received signal strength indicator information about a plurality of RSSIs measured in the RSSI measurement unit 55. More specifically, the carrier signal relay presence or absence judgment unit 57 judges the presence or absence of the relay of the carrier signals based on a variance for the plurality of calculated distances and a variance for the plurality of RSSIs. A judgment result by the carrier signal relay presence or absence judgment unit 57 is outputted to the processor 11.

The digital unit 31 generates data of an unmodulated signal (CW) based on the reference oscillator 50, and outputs the generated data to the transmission unit 32.

Next, the transmission unit 32 will be described. The transmission unit 32 is an analog circuit including a digital/analog converter (hereinafter abbreviated as a DAC) 61, a low-pass filter (hereinafter abbreviated as an LPF) 62, a modulator (MOD) 63, and an amplifier 64.

The DAC 61 receives digital data for a continuous wave (CW) from the digital unit 31, and converts the received digital data into an analog signal. Accordingly, the digital unit 31 generates the digital data for the continuous wave (CW).

The analog signal from the DAC 61 is inputted to the modulator 63 after passing through the LPF 62. The modulator 63 frequency-modulates an output signal of the LPF 62 in response to a frequency switching signal from the control unit 51. The analog signal from the LPF 62 is modulated into a signal having any one of the above-described frequencies f1, f2, and f3. In other words, the modulator 63 modulates an input signal in response to the frequency switching signal from the control unit 51 and generates a signal having any one of the frequencies f1, f2, and f3.

The amplifier 64 is a power amplifier (PA), and amplifies an output signal of the modulator 63 and feeds the amplified output signal to the antenna 34 via the antenna switch 35. The antenna switch 35 operates to connect the antenna 34 to the transmission unit 32 or the receiving unit 33 in response to an antenna control signal from the control unit 51.

Next, the receiving unit 33 will be described. The receiving unit 33 is an analog circuit including a low-noise amplifier (hereinafter abbreviated as an LNA) 65, a demodulator (DEMOD) 66, an LPF 67, and an analog-to-digital converter (hereinafter abbreviated as an ADC) 68.

The LNA 65 amplifies a received signal from the antenna 34 received via the antenna switch 35, and outputs the amplified received signal to the demodulator 66. The demodulator 66 demodulates the output signal of the LNA 65 and outputs a baseband signal in response to the frequency switching signal from the control unit 51.

An output signal of the demodulator 66 is fed to the ADC 68 via the LPF 67. The ADC 68 converts an output signal of the LPF 67 into a digital signal, and outputs the digital signal to the digital unit 31.

As described above, the transmission unit 32 and the receiving unit 33 constitute a first transmitter/receiver configured to transmit the three carrier signals respectively having the different frequencies (f1, f2, and f3) and receive, from the device 2, the three carrier signals respectively having the same frequencies as the frequencies of the three carrier signals using an output of the reference oscillator 50.

Figure 7:
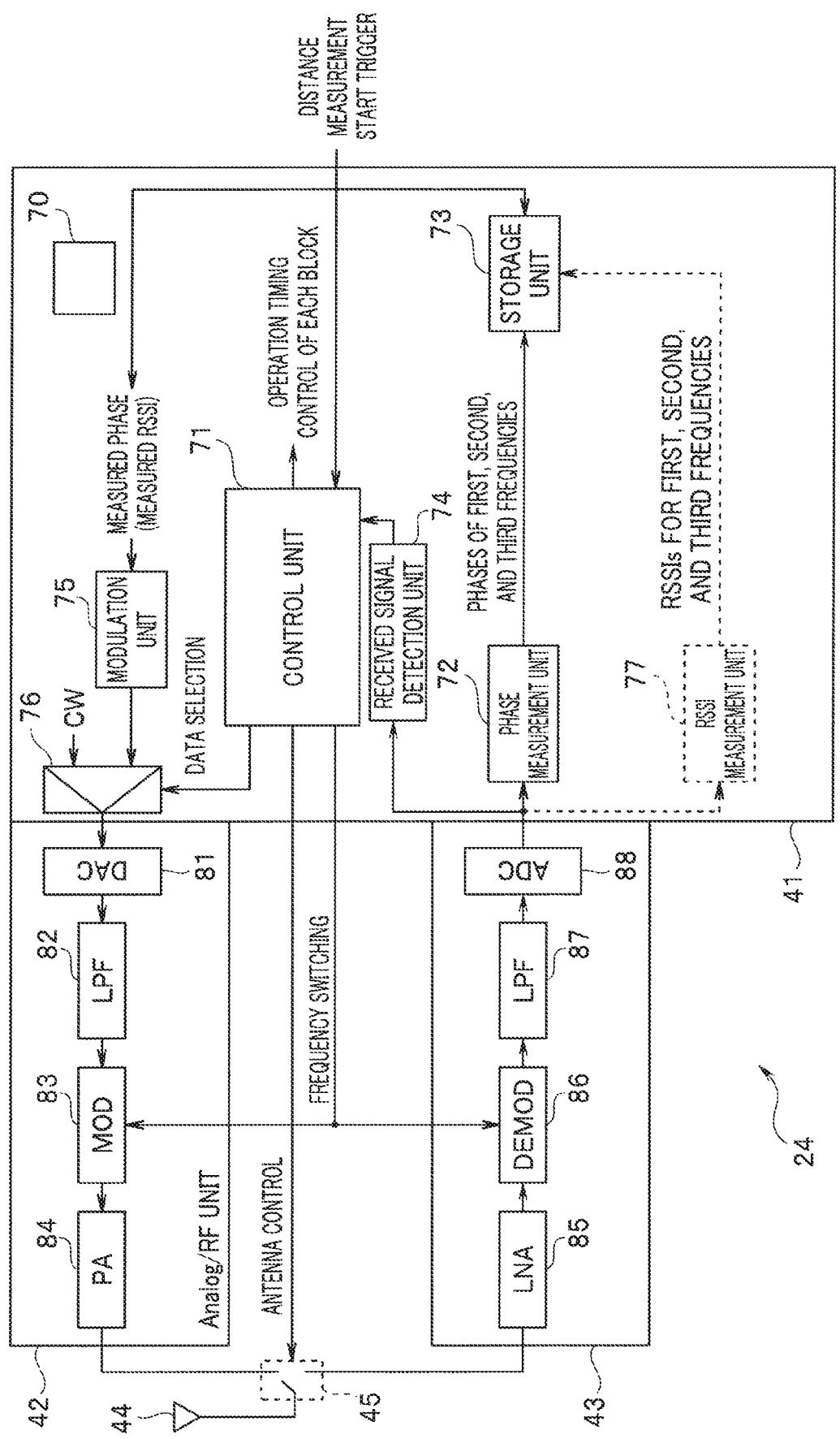
FIG. 7 is a circuit diagram of a distance measurement unit in the device loaded into the key according to the embodiment.

FIG. 7 is a circuit diagram of the distance measurement unit 24 in the device 2. The digital unit 41 is composed of digital circuits on the semiconductor device, for example. The digital unit 41 includes a reference oscillator 70, a control unit 71, a phase measurement unit 72, a storage unit 73, a received signal detection unit 74, a modulation unit 75, and a selector 76.

The reference oscillator 70 is a reference signal source configured to generate a basic clock signal of an operation within the distance measurement unit 24. The reference oscillator 70 operates independently of the reference oscillator 50 in the device 1. Upon receiving a distance measurement start trigger signal from the processor 21, the control unit 71 controls an operation timing of each of blocks such as the phase measurement unit 72 to perform an operation of a predetermined distance measurement sequence. The processor 21 transmits identification code information, and then outputs the distance measurement start trigger signal to the control unit 71 in the distance measurement unit 24.

The phase measurement unit 72 measures the phase of each of the carrier signals from the device 1. Information about the measured phase of each of the carrier signals is stored in the storage unit 73. In other words, the phase measurement unit 72 measures the phase of each of the received three carrier signals.

The storage unit 73 is a register storing the information about the phase of each of the carrier signals, as described above.

The received signal detection unit 74 detects reception of the first carrier signal from the device 1. Upon receiving the first carrier signal, the received signal detection unit 74 notifies the control unit 71 that the first carrier signal has been received.

The modulation unit 75 modulates the information about the phase of each of the carrier signals measured by the phase measurement unit 72 into a signal for transmitting the phase information. The phase information is modulated into an IQ signal corresponding to digital data of the information. In other words, the phase information, which has been measured by the distance measurement unit 24, is transmitted to the distance measurement unit 14 in the device 1.

The selector 76 selects data of the continuous wave (CW) based on the reference oscillator 70 or an output signal of the modulation unit 75 in response to a data selection signal from the control unit 71, and outputs the data or the output signal to the transmission unit 42.

Upon receiving a distance measurement start trigger signal from the processor 21, the control unit 71 enters a standby state of the carrier signals from the device 1 in the automobile C.

Therefore, the digital unit 41 generates digital data for the continuous wave (CW), and outputs the generated digital data to the transmission unit 42.

Next, the transmission unit 42 will be described. The transmission unit 42 is an analog circuit including a DAC 81, an LPF 82, a modulator (MOD) 83, and an amplifier 84.

The DAC 81 receives the digital data for the continuous wave (CW) from the digital unit 41, and converts the received digital data into an analog signal.

The analog signal from the DAC 81 is inputted to the modulator 83 after passing through the LPF 82. The modulator 83 frequency-modulates an output signal of the LPF 82 in response to a frequency switching signal from the control unit 71. The analog signal from the LPF 82 is modulated into a signal having any one of the above-described frequencies f1, f2, and f3. In other words, the modulator 83 modulates the input signal in response to the frequency switching signal from the control unit 71, and generates a signal having any one of the frequencies f1, f2, and f3.

The amplifier 84 is a power amplifier (PA), and amplifies an output signal of the modulator 83 and feeds the amplified output signal to the antenna 44 via the antenna switch 45. The antenna switch 45 operates to connect the antenna 44 to the transmission unit 42 or the receiving unit 43 in response to an antenna control signal from the control unit 71.

Next, the receiving unit 43 will be described. The receiving unit 43 is an analog circuit including an LNA 85, a demodulator (DE MOD) 86, an LPF 87, and an ADC 88.

The LNA 85 amplifies a received signal from the antenna 44 received via the antenna switch 45, and outputs the amplified received signal to the demodulator 86. The demodulator 86 demodulates the output signal of the LNA 85 and outputs a baseband signal in response to the frequency switching signal from the control unit 71.

An output signal of the demodulator 86 is fed to the ADC 88 via the LPF 87. The ADC 88 converts an output signal of the LPF 87 into a digital signal, and outputs the digital signal to the digital unit 41.

As described above, the transmission unit 42 and the receiving unit 43 constitute a second transmitter/receiver configured to transmit the three second carrier signals and receive the three carrier signals from the device 1 using an output of the reference oscillator 70.

(Function)

A flow of distance measurement processing will be described below.

Figure 8:
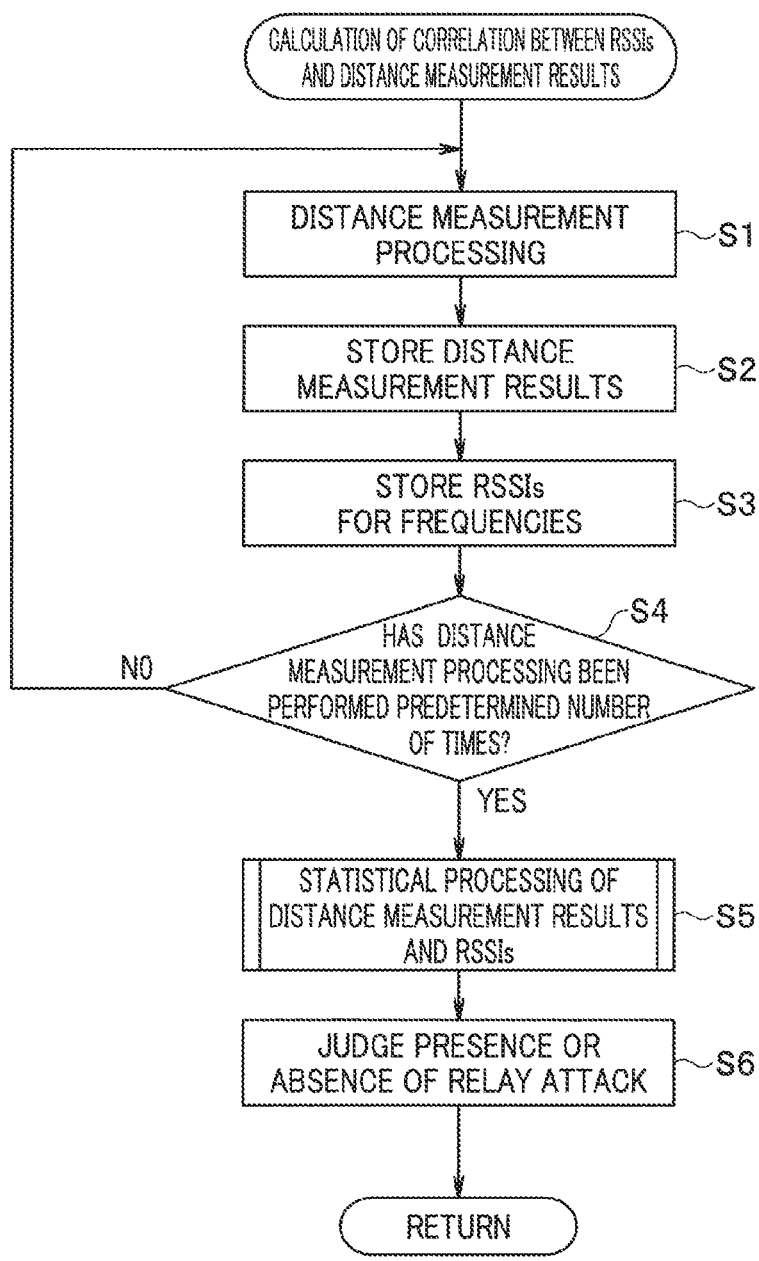
FIG. 8 is a flowchart illustrating a flow of processing of a digital unit in a distance measurement unit in the automobile according to the embodiment.

FIG. 8 is a flowchart illustrating a flow of processing by the digital unit 31 in the distance measurement unit 14 in the automobile C. FIG. 8 illustrates a flow of processing performed in performing distance measurement in the distance measurement unit 14 and judgment of presence or absence of a relay attack. The judgment of the presence or absence of the relay attack includes judgment of the presence or absence of the relay attack based on a distance measurement result and judgment of presence or absence of relay of carrier signals.

As described above, the processor 11 in the automobile C receives identification code information from the device 2 in the key K, and controls, when the received identification code information has been correctly authenticated, the distance measurement unit 14, to perform distance measurement processing.

The processor 11 controls the control unit 51 in the distance measurement unit 14, to transmit and receive a plurality of carrier signals between the devices 1 and 2 to perform distance measurement processing (step (hereinafter abbreviated as S)).

More specifically, the control unit 51 first controls the transmission unit 32, to transmit a carrier signal having a frequency f1. Upon receiving the carrier signal having the frequency f1 from the device 1, the device 2 controls the transmission unit 42, to transmit a carrier signal having the frequency f1 and transmit to the device 1 phase information of the carrier signal having the frequency f1 received from the device 1 under control of the control unit 71.

Then, the control unit 51 controls the transmission unit 32, to transmit a carrier signal having a second frequency f2. Upon receiving the carrier signal having the frequency f2 from the device 1, the device 2 controls the transmission unit 42, to transmit a carrier signal having the frequency f2 and transmit to the device 1 phase information of the carrier signal having the frequency f2 received from the device 1 under control of the control unit 71.

Further, the control unit 51 controls the transmission unit 32, to transmit a carrier signal having a third frequency f3. Upon receiving the carrier signal having the frequency f3 from the device 1, the device 2 controls the transmission unit 42, to transmit a carrier signal having the frequency f3 and transmit to the device 1 phase information of the carrier signal having the frequency f3 received from the device 1 under control of the control unit 71.

Upon receiving the carrier signal from the device 2, the RSSI measurement unit 55 in the device 1 measures the respective RSSIs of the carrier signals, and therefore holds data of each of the measured RSSIs.

The distance measurement operation unit 54 calculates a phase difference between the respective phases of two of the three carrier signals received by the device 1 and a phase difference between the respective phases of two of the three carrier signals received by the device 2 using phase information from the phase measurement unit 52 and phase information from the key-side phase receiving unit 53, and calculates the distance between the device 1 and the device 2 based on a sum of the two calculated phase differences.

The control unit 51 transfers a distance measurement result by the distance measurement operation unit 54 to the correlation judgment data calculation unit 56 and stores the transferred distance measurement result in the storage unit 56a (S2), and transfers the RSSI for each of the frequencies of the three carrier signals measured by the RSSI measurement unit 55 and stores the transferred RSSI in the storage unit 56a (S3).

Respective processes in S1 to S3 are performed in a single distance measurement processing. After step S3, the control unit 51 judges whether or not distance measurement processing has been performed a predetermined number of times (S4).

When the distance measurement processing has not been performed a predetermined number of times (S4: NO), the processing returns to S1, and the processes in S1 to S3 are performed.

When the distance measurement processing is performed a predetermined number of times (S4: YES), the control unit 51 controls the correlation judgment data calculation unit 56, to perform statistical processing of the distance measurement result and the RSSIs (S5). A process in S5 is performed in the correlation judgment data calculation unit 56. More specifically, in the statistical processing, a variance for a plurality of measured distance values Rm as the distance measurement result stored in the storage unit 56a and a variance for the plurality of RSSIs stored in the storage unit 56a are calculated, and using the variances, data for judging whether or not there is a correlation between the variance for the plurality of measured distance values Rm and the variance for the plurality of RSSIs is generated.

A correlation between the variance for the measured distance values Rm and the variance for the RSSIs will be described.

Figure 9:
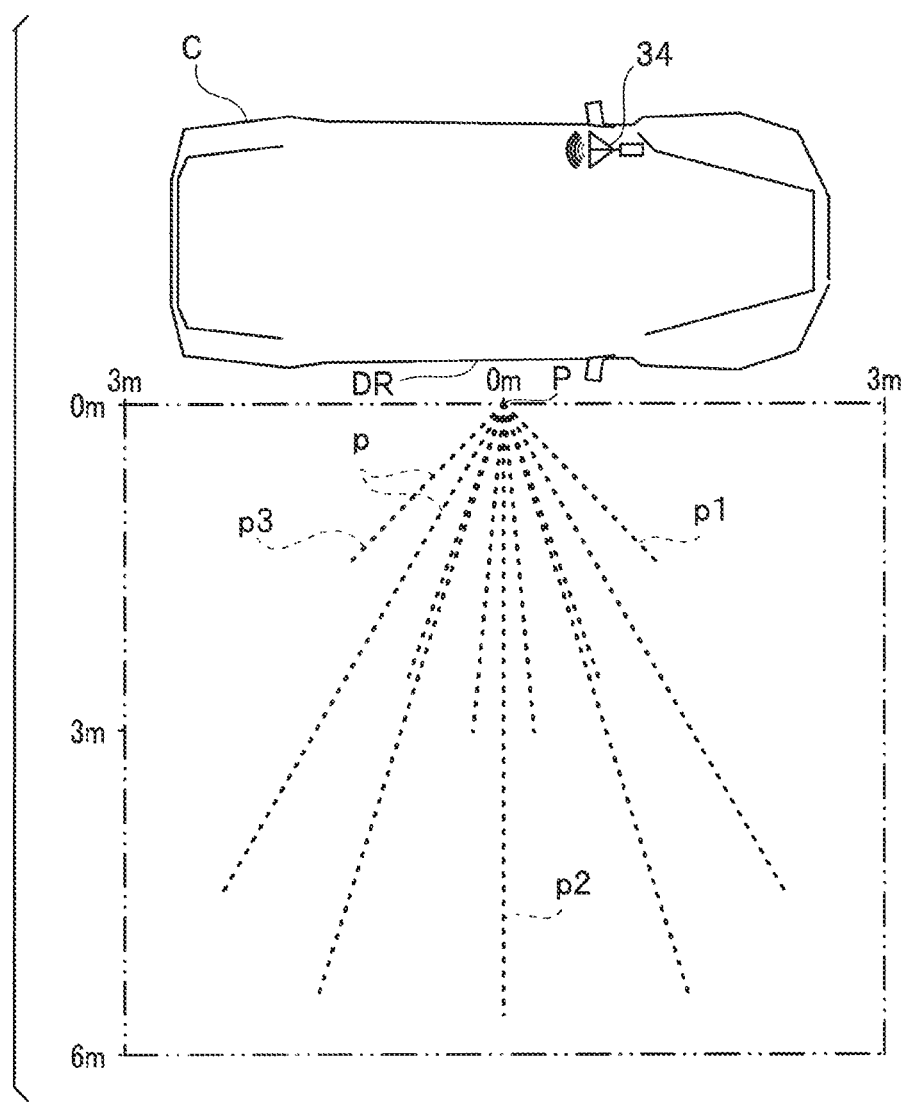
FIG. 9 is a diagram for describing an example of an antenna installed in the automobile and a plurality of approach paths of the user who holds the key to the automobile according to the embodiment.

FIG. 9 is a diagram for describing an example of an antenna 34 installed in the automobile C and a plurality of approach paths of the user U who holds a key K to the automobile C. FIG. 9 illustrates a case where a driving seat is on the right side, and the user U approaches a position P in the vicinity of a door DR on the right side of the automobile C. The antenna 34 is installed on the left front side within the automobile. FIG. 9 illustrates an example of the plurality of approach paths for the user U to approach the position P within a rectangular range (indicated by a two-dot and dash line) that is 3 meters forward, 3 meters backward, and 6 meters sideward from the position P in a front-back direction of the automobile C.

In FIG. 9, there exist a plurality of paths p for approaching the position P. For example, a path p1 represents a path in a case where the key K approaches the position P obliquely from the right front of the automobile C. A path p2 represents a path in a case where the key K approaches the position P from the right side of the automobile C. A path p3 represents a path in a case where the key K approaches the position P obliquely from the right rear of the automobile C.

Depending on the paths, the respective RSSIs of the carrier signals from the key K may be received by the antenna 34 in a temporarily weakened state due to an obstacle such as a pillar or the like of the automobile C. In other words, the RSSI may vary by shadowing. Therefore, in FIG. 9, in the case of the path p1, the carrier signals are disturbed by an A pillar on the side of the driving seat. Thus, the RSSI may change depending on the presence or absence of the obstacle between the key K and the automobile C.

When the carrier signals do not directly reach the antenna 44 from the key K, the carrier signals, which have passed through other paths due to multi-path, are relatively strengthened, and the measured distance value Rm calculated based on the carrier signals may also change. In other words, the RSSIs may vary by fading.

As described above, when the key K is within the LF area of the automobile C distance measurement is performed a predetermined number of times. At a timing of the each distance measurement, the three carrier signals respectively having the frequencies f1, f2, and f3 from the key K are received by the antenna 34, and the respective RSSIs of the carrier signals are calculated.

Figure 10:
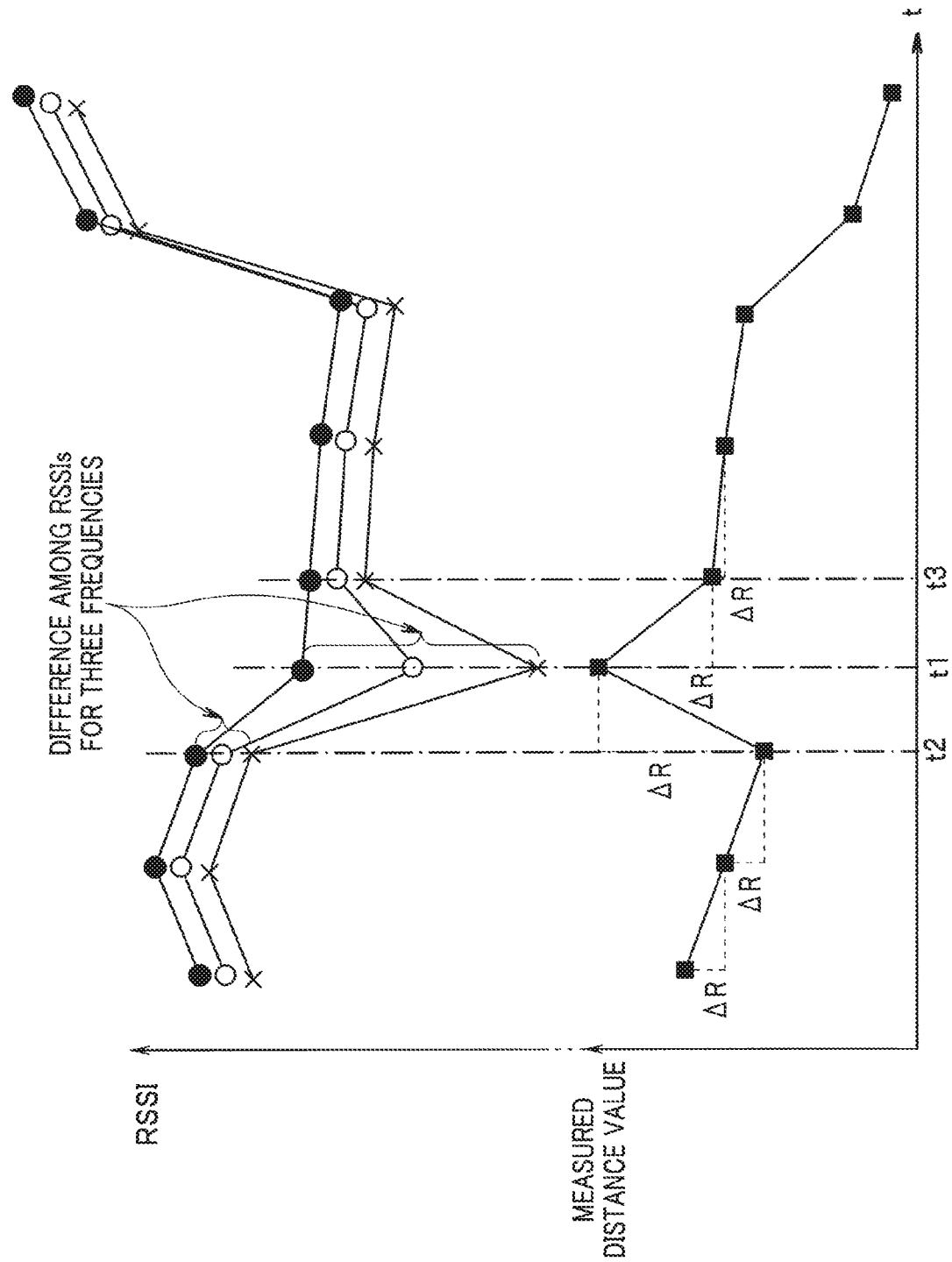
FIG. 10 is a graph illustrating respective changes in received signal strength indicators (RSSIs) of three carrier signals and measured distance values when the carrier signals have not been relayed but distance measurement has been performed a plurality of times within an LF area, according to the embodiment.

FIG. 10 is a graph illustrating respective changes in RSSIs of the three carrier signals and measured distance values R when the carrier signals have not been relayed but distance measurement has been performed a plurality of times within the LF area. A horizontal axis illustrated in FIG. 10 represents an elapse of a time period t. In FIG. 10, a graph on the lower side represents the change in the measured distance values m, and a graph on the upper side represents the respective changes in the RSSIs of the three carrier signals. FIG. 10 is a graph obtained when the key K has separated from the automobile C with an elapse of the time period t.

The respective RSSIs of the three carrier signals measured at each distance measurement timing change depending on a distance between the key K and the antenna 34. When there is no obstacle between the key K and the antenna 34, the respective RSSIs of the three carrier signals are substantially equal to one another. However, when fading occurs due to the above-described obstacle, the carrier signals from the key K do not easily reach the antenna 34. Thus, a difference among the respective RSSIs of the three carrier signals increases.

On the other hand, the measured distance value Rm also changes depending on the distance between the key K. and the antenna 44. When there is no obstacle between the key K and the antenna 44, the measured distance value Rl changes depending on the distance between the key K and the antenna 44. However, when the carrier signals from the key K do not easily reach the antenna 34 due to the above-described obstacle, an error occurs in the measured distance value Rm by an effect of the multi-path.

FIG. 10 indicates that the respective RSSIs of the carrier signals and the distance measured value Rm change because there is no obstacle between the key K and the antenna 34 at timings before and after a time point t1 but there is an obstacle between the key K and the antenna 34 at a timing of the time point t1.

In FIG. 10, at the time point t1, there is an obstacle between the key K and the antenna 34 so that a difference among the respective RSSIs of the three carrier signals is large. More specifically, the respective three RSSIs of the three carrier signals at the time point t1 greatly differ from one another, compared with the respective RSSIs of the three carrier signals at a time point t2 previous to the time point t1.

Similarly, the measured distance value Rm at the time point t1 greatly differs from the measured distance value Rm at the time point t2 previous to the time point t1. In FIG. 10, ΔR represents a difference between the measured distance values Rm at the two adjacent time points.

Figure 11:
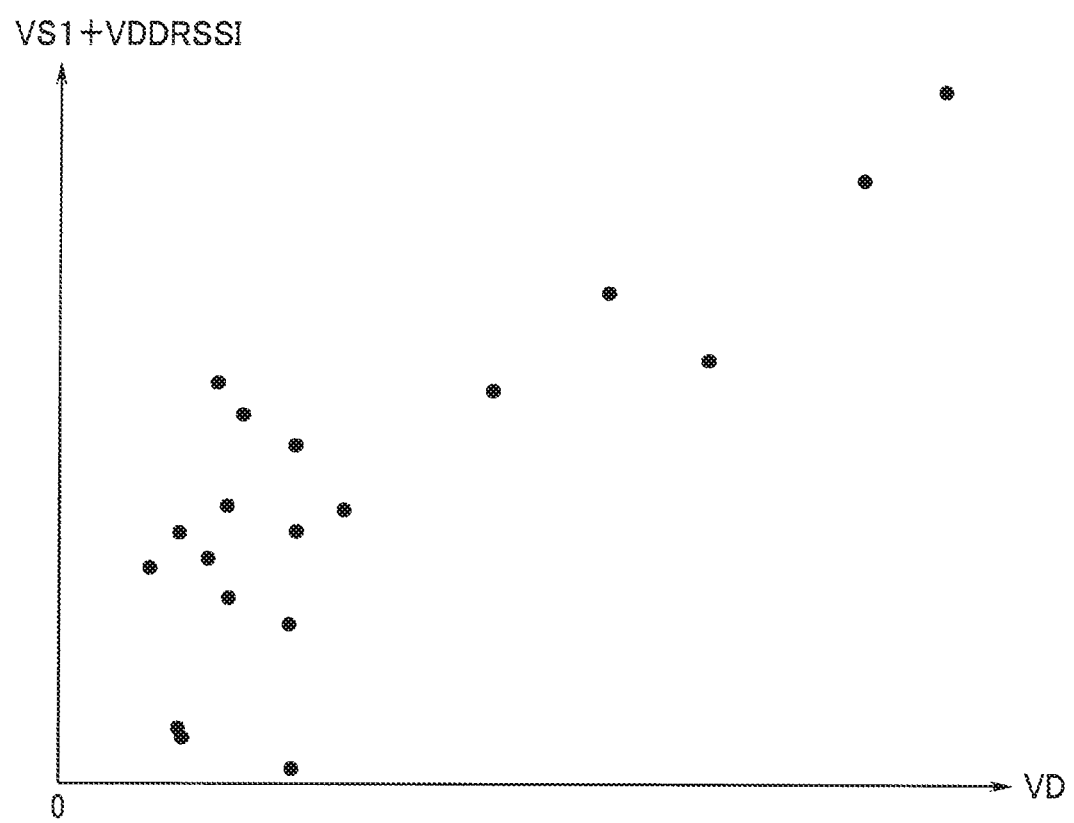
FIG. 11 is a graph illustrating a correlation between a variance for a plurality of RSSIs respectively measured at a plurality of timings and a variance for a plurality of measured distance values respectively calculated at the plurality of timings, based on an experiment result, according to the embodiment.

FIG. 11 is a graph illustrating a correlation between a variance for a plurality of RSSIs respectively measured at a plurality of timings and a variance for a plurality of measured distance values Rm respectively calculated at a plurality of timings based on a result of an experiment performed by the applicant. In FIG. 11, a value on a vertical axis and a value on a horizontal axis are respectively indicated by the values subjected to predetermined normalization. Each of points in FIG. 11 corresponds to a value of the variance for the plurality of RSSIs and a value of the variance for the plurality of distance measured values Rm obtained in one of the plurality of paths illustrated in FIG. 9.

In the present embodiment, the variance for the plurality of RSSIs include a variance VS1 for a difference between first RSSIs and a variance VDDRSSI for a difference between second RSSIs. The vertical axis illustrated in FIG. 11 represents a sum of the variance VS1 for the difference between the first RSSIs and the variance VDDRSSI for the difference between the second RSSIs. In the present embodiment, the variance for the measured distance values Rm is a variance VD for a difference between first measured distance values. The horizontal axis illustrated in FIG. 11 represents the variance VD.

The variance VS1 for the difference between the first RSSIs is a variance for a difference between the RSSIs adjacent to each other in time series of the one carrier signal measured in time series. In other words, the variance VS1 for the difference between the first RSSIs is a variance for a difference between a previous value and a current value of the RSSI of the one carrier signal.

The variance VDDRSSI for the difference between the second RSSIs is a variance for a difference between two sums adjacent to each other in time series that are each a sum of respective absolute values of three differences among the three RSSIs. In other words, the variance VDDRSSI for the difference between the second RSSIs is a variance for a difference between the previous sum and the current sum of the respective absolute values of the three differences among the three RSSIs.

The variance VD for the difference between the first measured distance values is a variance for a difference between the two measured distance values Rm adjacent to each other in time series. In other words, the variance VD for the difference between the first measured distance values is a variance for a difference between the previous measured distance value Rn and the current measured distance value Rm.

Then, each of the variances will be specifically described.

Assuming that when distance measurement is performed m times as a predetermined number of times within the LF area, L[n] is a measured distance value Rm as a result of an n-th (n is one of 1 to m) distance measurement, RSSI1[n] is an RSSI value obtained by n-th measurement for a carrier signal having a frequency f1, RSSI2[n] is an RSSI value obtained by n-th measurement for a carrier signal having a frequency f2, and RSSI3[n] is an RSSI value obtained by n-th measurement for a carrier signal having a frequency f3, a plurality of measured distance values Rm are calculated in time series, and a difference D[n] between a previous [(n−1)-th]measured distance value Rm and a current [n-th] measured distance value Rm is expressed by the following equation (1). A difference D between the measured distance values Rm corresponds to ΔR in FIG. 10.

$$D[n]=L[n-1]-L[n] \quad (1)$$

A sum DRSSI[n] of respective absolute values of three differences among the three RSSIs for the three frequencies f1, f2, and f3 is expressed by the following equation (2):

$$DRSSI[n] = |RSSI1[n] - RSSI2[n]| + \\ |RSSI3[n] - RSSI1[n]| + |RSSI3[n] - RSSI2[n]| \quad (2)$$

A difference DDRSSI[n] between a current (n-th) sum of the respective absolute values of the three differences expressed by the equation (2) and a previous ((n−1)-th) sum of the respective absolute values of the three differences expressed by the equation (2) is expressed by the following equation (3):

$$DDRSSI[n]=DRSSI[n-1]-DRSSI[n] \quad (3)$$

Differences DS1[n], DS2[n], and DS3[n] between the previous RSSI and the current RSSI for the three frequencies f1, f2 and f3 are respectively expressed by the following equations (4), (5), and (6):

$$DS1[n]RSSI1[n-1]-RSSI1[n] \quad (4)$$

$$DS2[n]=RSSI2[n-1]-RSSI2[n] \quad (5)$$

$$DS3[n]=RSSI3[n-1]-RSSI3[n] \quad (6)$$

A variance VD for a difference between the previous measured distance value Rm and the current measured distance value Rm is expressed by the following equation (7):

$$VD = \frac{1}{m}\sum_{n=1}^{m} D[n]^2 - \left\{\sum_{n=1}^{m} \frac{D[n]}{m}\right\}^2 \quad (7)$$

In other words, a variance for measured distance values Rm expressed by the equation (7) is a variance for a plurality of differences that are each a difference between a first distance value and a second distance value respectively calculated at two time points adjacent to each other in time series.

The variance VS1 for the previous RSSI1 and the current RSSI1 is expressed by the following equation (8):

$$VS1 = \frac{1}{m}\sum_{n=1}^{m} DS1[n]^2 - \left\{\sum_{n=1}^{m} \frac{DS1[n]}{m}\right\}^2 \quad (8)$$

Although only the variance VS1 for a difference between the previous RSSI1 and the current RSSI1 is used, a variance VS2 for a difference between a previous RSSI2 and a current RSSI2 and a variance VS3 for a difference between a previous RSSI3 and a current RSSI3 may also be used to calculate VS=VS1+VS2+VS3, and a variance VS for a sum of the respective differences between the three previous RSSIs and the three current RSSIs, instead of the equation (8).

Further, a variance VDDRSSI for the DDRSSI[n] (the equation (3)) is expressed by the following equation (9):

$$VDRSSI = \frac{1}{m}\sum_{n=1}^{m} DDRSSI[n]^2 - \left\{\sum_{n=1}^{m} \frac{DDRSSI[n]}{m}\right\}^2 \quad (9)$$

The horizontal axis illustrated in FIG. 11 represents value VD expressed by the equation (7), and the vertical axis illustrated in FIG. 11 represents a sum of VSI expressed by the equation (8) and VDDRSSI expressed by the equation (9).

In other words, a variance for a plurality of RSSIs includes a variance for a plurality of differences as a difference between two RSSIs respectively measured at two time points adjacent to each other in time series (the equation (8)) and a variance for a difference between a sum of respective absolute values of differences among a plurality of RSSIs measured at a first time point out of the two time points adjacent to each other and a sum of respective absolute values of differences among a plurality of RSSIs measured at a second time point out of the two time points adjacent to each other (the equation (9)).

An experiment performed by the applicant indicates that there is a correlation between the value (VD) expressed by the equation (7) and the sum (VS1+VDDRSSI) of the equation (8) and the equation (9). As illustrated in FIG. 11, the sum (VS1+VDDRSSI) of the equation (8) and the equation (9) changes in proportion to the value (VD) expressed by the equation (7).

Consider a case of a so-called relay attack in which the carrier signals between the key K and the automobile C are also relayed and the plurality of carrier signals the respective phases of which have been randomly changed are transmitted, within the LF area, to the automobile C from a relay device carried by a person in the vicinity of the automobile C.

Figure 12:
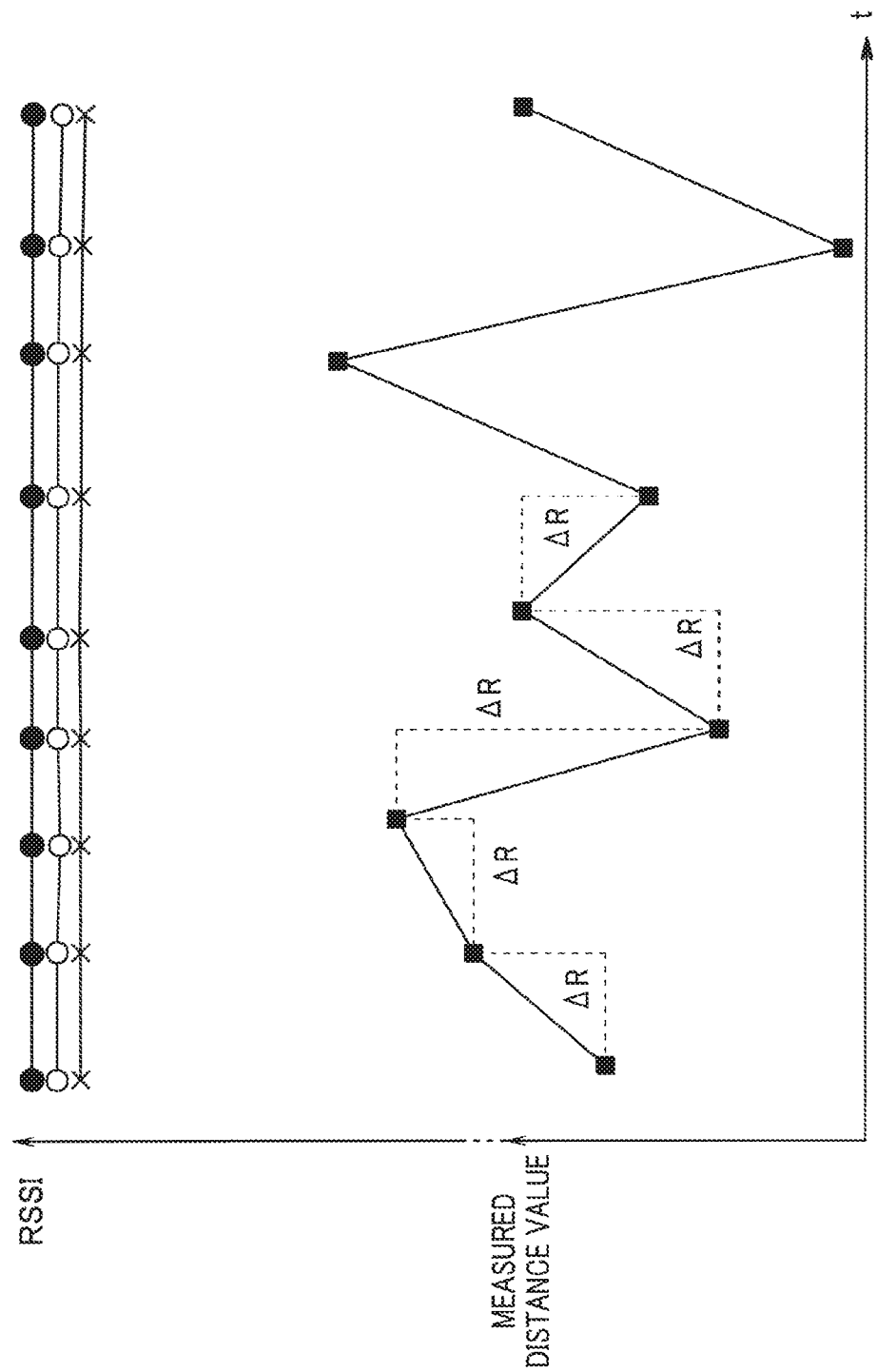
FIG. 12 is a graph illustrating an example of respective changes in three received signal strength indicators (RSSIs) and measured distance values in a relay attack in which a plurality of carrier signals respective phases of which have been randomly changed are relayed, according to the embodiment.

FIG. 12 is a graph illustrating an example of respective changes in three RSSIs and measured distance values Rm in a relay attack in which the plurality of carrier signals the respective phases of which have been randomly changed are relayed.

As illustrated in FIG. 12, when the relay attack is performed, the person in the vicinity of the automobile C is usually standing in the vicinity of the automobile C within the LF area. Thus, the RSSI of each of the carrier signals hardly varies, as illustrated in the graph on the upper side of FIG. 12. However, the plurality of carrier signals the respective phases of which have been randomly changed are transmitted. Thus, the measured distance value Rn based on each of the carrier signals randomly changes, as illustrated in the graph on the lower side of FIG. 12.

Figure 13:
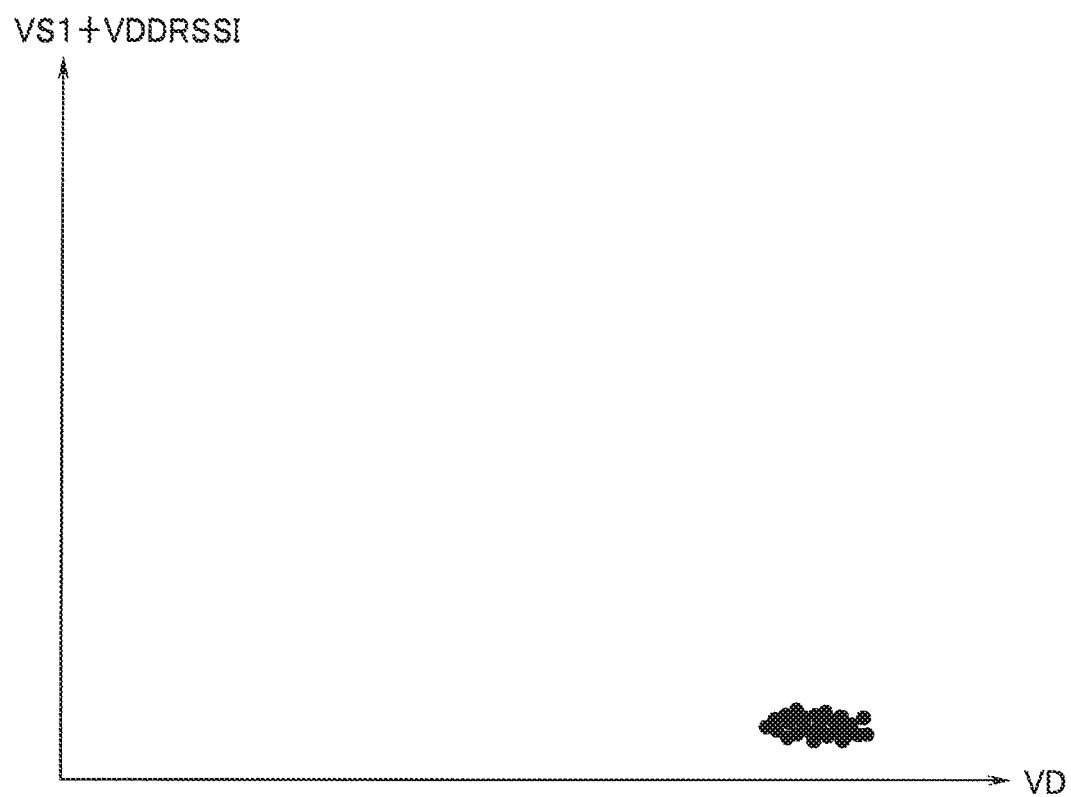
FIG. 13 is a graph illustrating a correlation between a variance for a plurality of received signal strength indicators (RSSIs) and a variance for a plurality of measured distance values when a relay attack in which a plurality of carrier signals respective phases of which have been randomly changed are transmitted has been performed, according to the embodiment.

FIG. 13 is a graph illustrating a correlation between a variance for a plurality of RSSIs and a variance for a plurality of measured distance values Rm when the relay attack in which the plurality of carrier signals the respective phases of which have been randomly changed are transmitted has been performed, A vertical axis illustrated in FIG. 13 represents a sum of a variance VS1 for a difference between first RSSs and a variance VDDRSSI for a difference between second RSSIs, like the vertical axis illustrated in FIG. 11, and a horizontal axis illustrated in FIG. 13 represents a variance VD, like the horizontal axis illustrated in FIG. 11. As illustrated in FIG. 13, a sum of the two variances (a sum of the equation (8) and the equation (9)) is small, and a variance for a difference between the measured distance values R (the equation (7)) is large.

In other words, when there is no relay attack, there is a correlation between the sum of the two variances (the sum of the equation (8) and the equation (9)) and the variance (the equation (7)) for the difference between the measured distance values Rm, as illustrated in FIG. 11. However, when a relay attack in which the carrier signals are relayed has been performed, there is no correlation between the sum of the two variances (the sum of the equation (8) and the equation (9)) and the variance (the equation (7)) for the difference between the measured distance values Rm, as illustrated in FIG. 13.

In other words, when a relay attack for relaying the carrier signals has not been performed, there is a relationship in which if the variance (the equation (7)) for the difference between the measured distance values Rm is small, the sum of the two variances (the sum of the equation (8) and the equation (9)) is also small, and if the variance (the equation (7)) for the difference between the measured distance values Rm is large, the sum of the two variances (the sum of the equation (8) and the equation (9)) is also large. When the relay attack for relaying the carrier signals has been performed, the variance (the equation (7)) for the difference between the measured distance values Rm is always large, and there is no correlation between the sum of the two variances (the sum of the equation (8) and the equation (9)) and the variance (the equation (7)) for the difference between the measured distance values Rm.

As described above, it can be judged whether or not the relay attack for relaying the carrier signals has been performed based on presence or absence of the correlation between the variance for the plurality of RSSIs and the variance for the plurality of measured distance values Rn.

Referring to FIG. 8 again, in S5, processing for calculating the variance (the equation (7)) for the difference between the measured distance value Rn and the sum of the two variances (the sum of the equation (8) and the equation (9)) is performed, and various types of calculated data are fed to the carrier signal relay presence or absence judgment unit 57.

The carrier signal relay presence or absence judgment unit 57 generates the graph illustrated in FIG. 11 or FIG. 13, for example, based on each of the variances calculated in S5, and judges presence or absence of the relay attack for relaying the carrier signals (S6).

Figure 14:
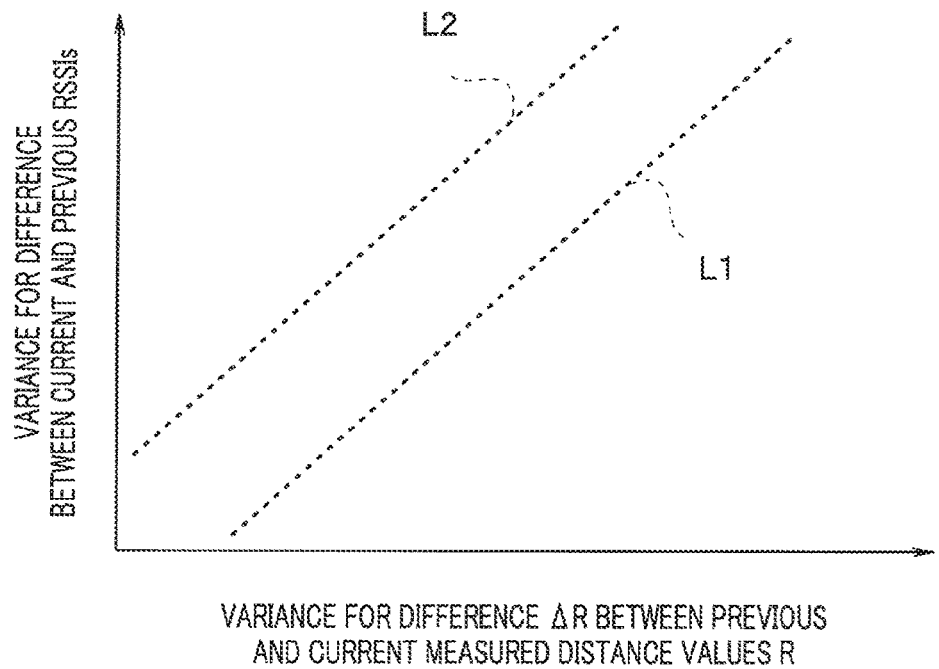
FIG. 14 is a diagram for describing an example of a method of judging presence or absence of a correlation between a variance for a plurality of measured received signal strength indicators (RSSIs) and a variance for a plurality of measured distance values according to the embodiment.

FIG. 14 is a diagram for describing an example of a method of judging presence or absence of a correlation between a variance for a plurality of measured RSSIs and a variance for a plurality of measured distance values Rm.

In a case where points respectively corresponding to the variance for the plurality of measured RSSIs and the variance for the plurality of calculated measured distance values Rm are plotted as illustrated in FIG. 11, when almost all of the plurality of points are plotted between lines L1 and L2 illustrated in FIG. 14, it is judged that there is a correlation. The lines L1 and L2 are previously set by an experiment or the like.

When almost all of the plurality of points are plotted below the line L illustrated in FIG. 14, it may be judged that the carrier signals have been relayed.

Figure 15:
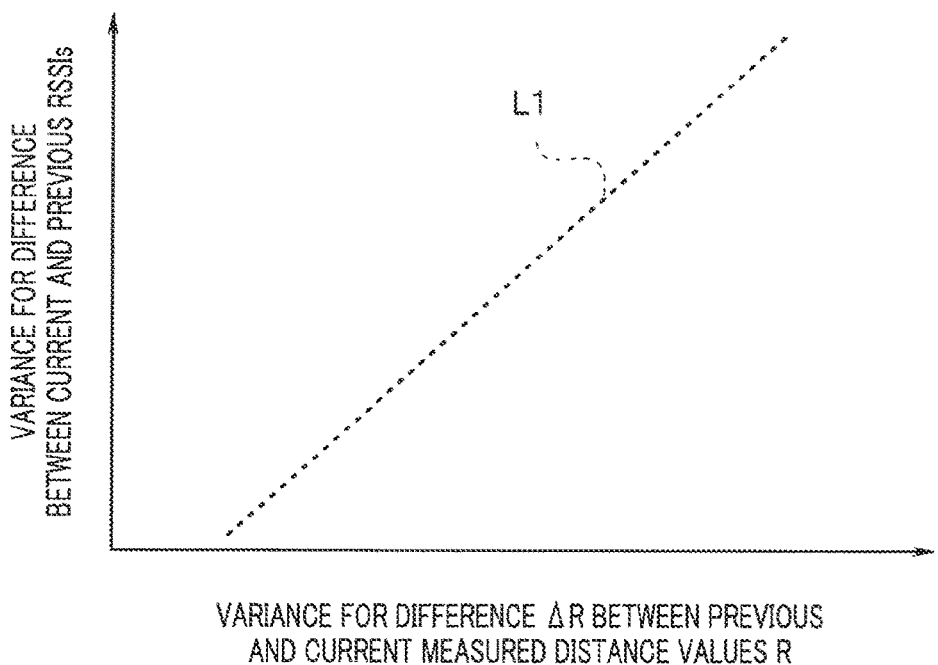
FIG. 15 is a diagram for describing another example of a method of judging presence or absence of a correlation between a variance for a plurality of measured received signal strength indicators (RSSIs) and a variance for a plurality of measured distance values according to the embodiment.

FIG. 15 is a diagram for describing another example of a method of judging presence or absence of a correlation between a variance for a plurality of measured RSSIs and a variance for a plurality of measured distance values Rn.

In a case where points respectively corresponding to the variance for the plurality of measured RSSIs and the variance for the plurality measured distance values Rm are plotted as illustrated in FIG. 11, when almost all of the plurality of points are plotted below a line L1 illustrated in FIG. 15, it is judged that the carrier signals have been relayed. When almost all of the plurality of points are plotted above the line L1 illustrated in FIG. 15, it is judged that there is a correlation.

In other words, the carrier signal relay presence or absence judgment unit 57 judges presence or absence of the relay of the carrier signals based on presence or absence of a correlation between a sum of a second variance (the equation (8)) and a third variance (the equation (9)) and a first variance (the equation (7)).

Therefore, in S6, the carrier signal relay presence or absence judgment unit 57 can judge whether or not the carrier signals have been relayed using the judgment method as illustrated in FIG. 14 or FIG. 1. The carrier signal relay presence or absence judgment unit 57 outputs to the processor 11 a judgment signal representing a result of the judgment whether or not the carrier signals have been relayed.

The processor 11 judges whether or not a permission signal for permitting door unlocking is outputted based on the measured distance values Rm from the distance measurement operation unit 54 and the judgment signal about presence or absence of the relay attack from the carrier signal relay presence or absence judgment unit 57.

According to the above-described processing, when each of the measured distance values Rm exceeds a predetermined distance, e.g., 2 meters, there is a possibility of relay attack. Thus, the processor 11 does not output the permission signal for permitting door unlocking to a control device in the automobile C, for example.

Further, even if the measured distance values Rm are the predetermined distance or less, when there is a correlation between the variance for the plurality of distance measurement results and the variance for the plurality of RSSIs, it is assumed that the key K is within a predetermined distance from the automobile C and the carrier signals have not been relayed. Thus, the processor 11 outputs the permission signal for permitting door unlocking to the control device in the automobile C. In this case, the carrier signal relay presence or absence judgment unit 57 outputs to the processor 11 a judgment signal indicating that a relay attack using relay of the carrier signals has not been performed.

Upon receiving the permission signal for permitting door unlocking from the processor 11, the control device configured to control unlocking of the door of the automobile C outputs a control signal for unlocking the door when a human hand has touched the door, for example.

However, even if the measured distance values Rm are the predetermined distance or less, when there is no correlation between the variance for the plurality of distance measurement results and the variance for the plurality of RSSIs, it is assumed that the carrier signals have been relayed even if the key K is within a predetermined distance from the automobile C. Thus, the processor 11 does not output the permission signal for permitting door unlocking to the control device in the automobile C. In this case, the carrier signal relay presence or absence judgment unit 57, described below, outputs to the processor 11 a judgment signal indicating that a relay attack in which the carrier signals have been relayed is performed.

As described above, when the carrier signals have been relayed, it is assumed that a relay device carried by a thief or the like in the vicinity of the automobile C generates a plurality of carrier signals respective phases of which have been randomly changed and transmits the generated carrier signals to the automobile C such that the measured distance value Rm indicating that the key K is close to the automobile C is calculated. In this case, although the measured distance value Rm calculated using the phase of each of the carrier signals in the device 1 randomly changes. However, a plurality of carrier signals from the relay device are emitted from a substantially stationary position. Therefore, the variance for respective RSSIs of the plurality of carrier signals is small. In other words, when the carrier signals have been relayed, there is no correlation between the variance for the measured distance values Rm as the plurality of distance measurement results and the variance for the plurality of RSSIs.

On the other hand, when the carrier signals have not been relayed and the key K of the user U approaches the automobile C, the plurality of carrier signals are transmitted from the device 2 in the key K as the user U approaches the automobile C, and the measured distance value Rm calculated using the phase of each of the carrier signals in the device 1 gradually changes. In this case, as the user U approaches the automobile C, the plurality of carrier signals are gradually strengthened. Thus, the variance for respective RSSIs of the plurality of carrier signals changes. Therefore, when the carrier signals have not been relayed, there is a correlation between the variance for the measured distance values Rr as the plurality of distance measurement results and the variance for the plurality of RSSIs.

Note that although the presence or absence of the relay of the carrier signals is judged based on presence or absence of the correlation between the value (VD) expressed by the equation (7) and the sum (VS1+VDDRSSI) of the equation (8) and the equation (9), the presence or absence of the relay of the carrier signals may be judged using a correlation between other values.

(Modification 1)

As a modification 1, a variance for measured distance values Rm may be used as the variance for the measured distance values Rm, and a variance for RSSIs and a variance for a sum of respective absolute values of three differences among three RSSIs for three frequencies may be used as the variance for the RSSIs.

In the modification 1, a variance VL for the measured distance values Rl is expressed by the following equation (11):

$$VL = \frac{1}{m}\sum_{n=1}^{m} L[n]^2 - \left\{\sum_{n=1}^{m} \frac{L[n]}{m}\right\}^2 \quad (11)$$

Here, L[n] is the measured distance value Rm as a result of an n-th (n is one of 1 to m) distance measurement. Distance measurement is performed m times as a predetermined number of times within an L area. The equation (11) represents a variance for m measured distance values Rm.

In other words, the variance for the measured distance values Rm is a variance for the plurality of calculated measured distance values Rm (the equation (11)).

As the variance for the RSSIs, a variance for m RSSIs, for example, a variance VR1 for RSSIs expressed by the following equation (12) is used:

$$VR1 = \frac{1}{m}\sum_{n=1}^{m} RSSI1[n]^2 - \left\{\sum_{n=1}^{m} \frac{RSSI1[n]}{m}\right\}^2 \quad (12)$$

Note that although only a variance VR1 for RSSI1 is used, respective variances VR2 and VR3 for other two RSSI2 and RSSI3 may be used to calculate VR=VR1+VR2+VR3, and a sum VR of respective variances for the three RSSIs may be used instead of the equation (12).

Further, as the variance for the RSSIs, a variance VDRSSI for a sum of respective absolute values of three differences among three RSSIs expressed by the following equation (13), for example, is used:

$$VDRSSI = \frac{1}{m}\sum_{n=1}^{m} DRSSI[n]^2 - \left\{\sum_{n=1}^{m} \frac{DRSSI[n]}{m}\right\}^2 \qquad (13)$$

In the modification 1, a horizontal axis illustrated in FIG. 11 represents a value of VL expressed by the equation (11), and a vertical axis illustrated in FIG. 11 represents a sum of VR1 expressed by the equation (12) and VDRSSI expressed by the equation (13).

In other words, the variance for the RSSI includes a variance (the equation (12)) for the plurality of measured RSSIs and a third variance (the equation (13)) for a sum of respective absolute values of differences among the plurality of measured RSSIs.

The carrier signal relay presence or absence judgment unit 57 judges presence or absence of relay of carrier signals based on presence or absence of a correlation between the variance (the equation (II)) and a sum of the variance (the equation (12)) and the variance (the equation (13)). The presence or absence of the correlation between the variance (the equation (11)) and the sun of the variance (the equation (12)) and the variance (the equation (13)) is also judged based on the graphs respectively illustrated in FIGS. 14 and 15, described above.

In the modification 1, the presence or absence of the correlation is judged using the variance VL for the measured distance values Rm, the variance VR for the RSSIs, and the variance VDRSSI for the sum of the respective absolute values of the three differences among the three RSSIs for three frequencies.

(Modification 2)

As a modification 2, it may be judged that carrier signals have been relayed if a sum of respective absolute values of values each obtained by subtracting a difference (e.g., the equation (4)) between a previous value and a current value of one of the RSSIs measured at the same time point from a difference D[n] between previous and current measured distance values Rm is a predetermined threshold value or more. This is based on the estimation that there is a correlation between the difference between the previous and current measured distance values Rm and the difference between the previous and current values of one of the RSSIs measured at the same time point when the carrier signals have not been relayed.

For example, a value SD expressed by the following equation (21) is used.

$$SD = \frac{1}{m}\left\{\sum_{n=1}^{m} |D[n] - A*DS1[n]|\right\} \qquad (21)$$

Here, A is a constant for normalization for making respective scales of values of D[n] and RSSI[n] match each other. Further, the sum of the respective absolute values of the values each obtained by subtracting the difference (the equation (4)) between the previous value and the current value of one of the three RSSIs measured at the same time point from the difference D[n] between the previous and current measured distance values Rm is divided by a number of times of distance measurement n.

In other words, the carrier signal relay presence or absence judgment unit 57 judges presence or absence of relay of the carrier signals by comparing a predetermined threshold value (TH1) with a sum of respective absolute values of values each obtained by subtracting a difference (DS1[n]) between the two RSSIs respectively measured at two time points adjacent to each other in time series from a difference (D[n]) between the measured distance values Rm respectively calculated at the two time points adjacent to each other or with a value obtained by dividing the sum by a number of times of distance measurement.

Accordingly, it is judged that the carrier signals have been relayed if the value expressed by the equation (21) is the predetermined threshold value or more, and it is judged that the carrier signals have not been relayed if the value expressed by the equation (21) is less than the predetermined threshold value TH1.

Note that although only a difference DS1 for an RSSI1 is used, respective differences DS2 and DS3 for other two RSSI2 and RSSI3 may be used to calculate SD=DS1+DS2+DS3, and a sum SD of respective differences for the three RSSIs may be used instead of the equation (21).

Note that the following equation (22) may be used instead of the equation (21):

$$SDR = \frac{1}{m}\left\{\sum_{n=1}^{m} |D[n] - A*DS1[n] - B*DDRSSI[n]|\right\} \qquad (22)$$

In other words, if a sum SDR of respective absolute values of values each obtained by subtracting the difference (the equation (4)) between the previous value and the current value of one of the RSSIs measured at the same time point and a difference (the equation (3)) between a previous sum and a current sum of respective three differences among three RSSIs for three frequencies from the difference D[n] between the previous and current measured distance values Rm is a predetermined threshold value TH2 or more, it may be judged that the carrier signals are relayed. The threshold value TH2 is smaller than TH1.

Here, B is a constant for normalization for making respective scales of values D[n] and DRSSI[n] match each other. Further, the sum of the respective absolute values of the values each obtained by subtracting the difference (the equation (4)) between the previous value and the current value of one of the three RSSIs measured at the same time point and the difference (the equation (3)) between the previous sum and the current sum of the respective three differences among the RSSIs for the three frequencies from the difference D[n] between the previous and current measured distance values Rm is divided by a number of times of distance measurement m.

In other words, the carrier signal relay presence or absence judgment unit 57 judges presence or absence of relay of the carrier signals by comparing a predetermined threshold value (TH2) with a sum of respective absolute values of values each obtained by subtracting a difference (DS1[n] (the equation (4)) between two RSSIs respectively measured at two time points adjacent to each other in time series and a difference (DDRSSI[n] (the equation (3)) between a sum of respective absolute values of differences among a plurality of RSSIs measured at a first time point out of the two time points adjacent to each other and a sum of respective absolute values of differences among a plurality of RSSIs measured at a second time point out of the two time points adjacent to each other from a difference (D[n]) between measured distance values Rm respectively calculated at the two time points adjacent to each other or with a value obtained by dividing the sum by a number of times of distance measurement (m).

As described above, according to the above-described embodiment and modifications, there can be provided a distance measurement apparatus and a distance measurement method capable of judging the presence or absence of relay of the carrier signals.

Note that the respective RSSIs of the three carrier signals measured in the RSSI measurement unit 55 in the device 1 are used in the above-described embodiment and modifications. Alternatively, an RSSI measurement unit 77 may be provided also in the distance measurement unit 24 in the device 2 as illustrated by the dotted lines in FIG. 7, to transmit the respective RSSIs of the carrier signals received by the device 2 to the device 1, and presence or absence of a correlation may be judged in the device 1 by using the respective RSSIs of the plurality of carrier signals received by each of the devices 1 and 2 or by using the respective RSSIs of the plurality of carrier signals received by the device 2.

Although the correlation judgment data calculation unit 56 and the carrier signal relay presence or absence judgment unit 57 in the distance measurement unit 14 are each implemented by a circuit different from the control unit 51 in the above-described embodiment and modifications, the correlation judgment data calculation unit 56 and the carrier signal relay presence or absence judgment unit 57 may be implemented by software or a circuit in the control unit 51 by feeding respective data of measured distance vales Rm and RSSIs to the control unit 51 as indicated by a two-dot and dash line in FIG. 6.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. A distance measurement apparatus that calculates a plurality of distances between a first device and a second device based on carrier phase detection, the distance measurement apparatus comprising:
   a distance measurement operation unit configured to calculate the plurality of distances based on respective phases of a plurality of carrier signals included in each of a first distance measurement signal and a second distance measurement signal respectively transmitted from the first device and the second device;
   a received signal strength indicator measurement unit configured to measure respective received signal strength indicators of at least some of the plurality of carrier signals; and
   a carrier signal relay presence or absence judgment unit configured to judge presence or absence of relay of the carrier signals based on distance information about the plurality of distances calculated in the distance measurement operation unit and received signal strength indicator information about the plurality of received signal strength indicators measured in the received signal strength indicator measurement unit,
   the first device transmits a plurality of first carrier signals in the first distance measurement signal,
   the second device transmits a plurality of second carrier signals in the second distance measurement signal,
   the first device detects a phase of each of the plurality of second carrier signals,
   the second device detects a phase of each of the plurality of first carrier signals, and transmits phase information about the detected phase of each of the first carrier signals to the first device,
   the distance measurement operation unit is provided in the first device, and calculates the plurality of distances based on the detected phase of each of the second carrier signals and the received phase information, and
   the carrier signal relay presence or absence judgment unit judges the presence or absence of the relay of the carrier signals based on a correlation between a variance for the plurality of calculated distances and a variance for the plurality of received signal strength indicators.

2. The distance measurement apparatus according to claim 1, wherein
   the plurality of distances are calculated in time series,
   the variance for the plurality of distances is a first variance for a plurality of first differences as a difference between a first distance value and a second distance value respectively calculated at two time points adjacent to each other in time series,
   the variance for the plurality of received signal strength indicators includes a second variance for a plurality of second differences as a difference between the two received signal strength indicators respectively measured at the two time points adjacent to each other in time series and a third variance for a third difference between a sum of respective absolute values of differences among the plurality of received signal strength indicators measured at a first time point out of the two time points adjacent to each other and a sum of respective absolute values of differences among the plurality of received signal strength indicators measured at a second time point out of the two time points adjacent to each other, and
   the carrier signal relay presence or absence judgment unit judges the presence or absence of the relay of the carrier signals based on presence or absence of a correlation between the first variance and a sum of the second variance and the third variance.

3. The distance measurement apparatus according to claim 1, wherein
   the plurality of distances are calculated in time series,
   the variance for the distances is a first variance for a calculated plurality of measured distance values,
   the variance for the plurality of received signal strength indicators includes a second variance for the plurality of measured received signal strength indicators and a third variance for a sum of respective absolute values of differences among the plurality of measured received signal strength indicators, and
   the carrier signal relay presence or absence judgment unit judges the presence or absence of the relay of the carrier signals based on presence or absence of a correlation between the first variance and a sum of the second variance and the third variance.

4. The distance measurement apparatus according to claim 1, wherein
   the plurality of distances are calculated in time series, and
   the carrier signal relay presence or absence judgment unit judges the presence or absence of the relay of the carrier signals by comparing a predetermined threshold value with a sum of respective absolute values of values each obtained by subtracting a difference between two received signal strength indicators respectively measured at two time points adjacent to each other in time series from a difference between measured distance values respectively calculated at the two time points adjacent to each other or with a value obtained by dividing the sum by a number of times of distance measurement.

5. The distance measurement apparatus according to claim 1, wherein the plurality of distances are calculated in time series, and the carrier signal relay presence or absence judgment unit judges the presence or absence of the relay of the carrier signals by comparing a predetermined threshold value with a sum of respective absolute values of values each obtained by subtracting a difference between two received signal strength indicators measured at two time points adjacent to each other in time series and a difference between a sum of respective absolute values of differences among the plurality of received signal strength indicators measured at a first time point out of the two time points adjacent to each other and a sum of respective absolute values of differences among the plurality of received signal strength indicators measured at a second time point out of the two time points adjacent to each other from a difference between the measured distance values respectively calculated at the two time points adjacent to each other or with a value obtained by dividing the sum by a number of times of distance measurement.

6. A distance measurement method for calculating a plurality of distances between a first device and a second device based on carrier phase detection, the distance measurement method comprising:

the first device transmitting a plurality of first carrier signals in the first distance measurement signal;

the second device transmitting a plurality of second carrier signals in the second distance measurement signal;

the first device detecting a phase of each of the plurality of second carrier signals;

the second device detecting a phase of each of the plurality of first carrier signals, and transmitting phase information about the detected phase of each of the first carrier signals to the first device;

calculating the plurality of distances based on respective phases of a plurality of carrier signals included in each of a first distance measurement signal and a second distance measurement signal respectively transmitted from the device 1 and the device 2;

measuring respective received signal strength indicators of at least some of the plurality of carrier signals;

judging presence or absence of relay of the carrier signals based on distance information about the plurality of calculated distances and received signal strength indicator information about the plurality of measured received signal strength indicators, and judging the presence or absence of the relay of the carrier signals based on a correlation between a variance for the plurality of calculated distances and a variance for the plurality of measured received signal strength indicators.

* * * * *